J. H. BARLEY.
Wheel-Cultivator.
No. 69,162.  Patented Sept. 24, 1867.
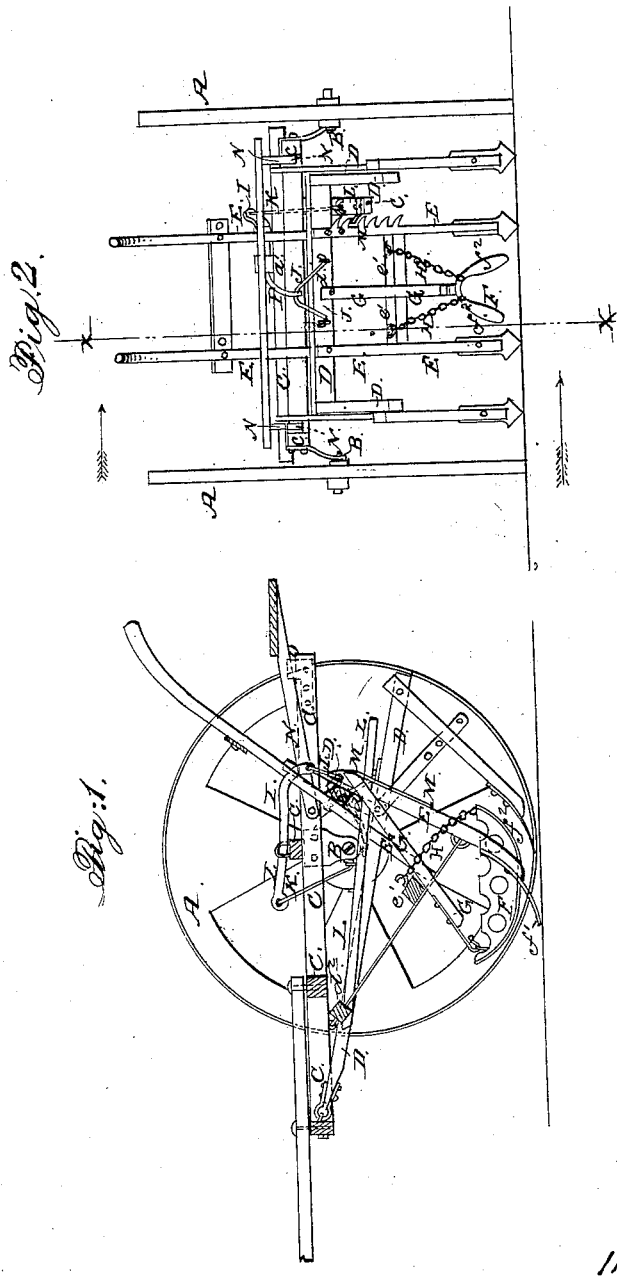
WITNESSES;
INVENTOR;

United States Patent Office.

J. H. BARLEY, OF SEDALIA, MISSOURI.

Letters Patent No. 69,162, dated September 24, 1867.

---

CULTIVATOR.

---

The Schedule referred to in these Letters Patent and making part of the same.

---

TO ALL WHOM IT MAY CONCERN:

Be it known that I, J. H. BARLEY, of Sedalia, in the county of Pettis, and State of Missouri, have invented a new and useful improvement in Cultivator; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved cultivator, taken through the line $x\ x$, fig. 2.

Figure 2 is a rear view of the same.

Similar letters of reference indicate like parts.

My invention has for its object to improve the construction of my improved cultivator, the Letters Patent for which are dated September 4, 1866, so as to make it more convenient to be used and more effective in operation; and it consists in the combination and arrangement of the loop or hook, bent lever, connecting-rod or chain, and lever-pawl with each other, and with the pivoted cultivator-frame, for the purpose of raising and lowering the ploughs as desired; in the combination of the rack with the vertically and laterally-moving plough-standard and lever-pawl for the purpose of holding the ploughs at any desired elevation; in the combination of the pivoted seat-bars and adjustable holders with the cultivator-frame; and in the shield, constructed with flanges and wings, and provided with supporting bars and chains, by which it is pivoted to the plough-frame; the whole being constructed and arranged as hereinafter more fully described.

A are the wheels. B are the axles. C is the cultivator-frame. D is the outer plough-frame, having a vertical movement, and E is the inner plough-frame, having a vertical movement in connection with the frame D, and at the same time having a lateral movement independent of said frame. F is the shield, which is made substantially in the shape shown in figs. 1 and 2, having holes through it, through which the fine mould passes to the plants. The edges of the shield F have outwardly-projecting flanges $f^1$ formed upon them, which at the rear end of said shield are expanded into wings $f^2$, so as to throw the clods, &c., into the open furrows in the rear of the inner ploughs. The forward end of the shield F is pivoted or hinged to the lower end of the bar G, the middle part of which is pivoted to the cross-bar $e'$ of the frame E, and its upper end is loosely pivoted to the cross-bar $d^1$ of the frame D, so that the shield may be moved with the movement of the said frames D and E. The rear end of the shield F is supported by the chains H, the forward ends of which are attached to the cross-bar $e'$ near its ends, as shown in fig. 2. To the cross-bar $e'$ of the frame C is pivoted the middle part of the lever I, the ends of which are bent at right angles to the line of its axis. The rear end of the bent lever I is connected to the middle part of the cross-bar $d^1$ by the loop or bent hook J, so that by raising the rear end of the lever I, the plough-frames D and E will be elevated as desired. To the forward end of the lever I is pivoted the upper end of the connecting-rod K, the lower end of which is pivoted to the lever-pawl L. The forward end of the lever-pawl L is pivoted to the cross-bar $d^2$ of the frame D, and its rear end extends back into such a position that it can be reached and operated by the foot of the driver. To the upper side of the lever L is attached a plate, $l'$, the edge of which projects so as to take hold of the teeth of the rack M attached to one of the uprights of the frame E, to hold the plough-frames E and D elevated, as required. N are the bars of the driver's seat, the forward ends of which are pivoted to the side bars of the frame C, and their rear parts rest upon the supports O, as shown in fig. 1. The supports O are secured to frame C by bolts passing through the said supports and through one or the other of the holes formed through the said bars.

By this construction the height of the seat may be regulated to adjust it to the requirements of the driver. It also renders it much more convenient for the driver to get into his seat, for he has only to raise the seat, pass beneath it, drop it behind him, and, stepping upon the plough-beam, he easily and conveniently mounts to his seat.

What I claim as new, and desire to secure by Letters Patent, is—

1. The combination and arrangement of the loop or bent hook J, bent lever I, connecting-rod or chain K, and lever-pawl L with each other, and with the frames D and E of the cultivator, substantially as herein shown and described, and for the purpose set forth.

2. The combination of the rack M with the standard of the frame E, and with the lever-pawl L, to operate in connection with the loop or bent hook J and bent lever I, substantially as herein shown and described, and for the purpose set forth.

3. The combination of the pivoted seat-bars N and adjustable holders O with the side bars of the cultivator-frame C, substantially as herein shown and described, and for the purpose set forth.

4. The shield F, constructed with flanges $f^1$ and wings $f^2$, and connected to the frames E and D by the bar G and chains H, substantially as herein shown and described, and for the purpose set forth.

J. H. BARLEY.

Witnesses:
THOMS. K. BARLEY,
THOS. F. STRAHORN.